United States Patent Office

3,151,988
Patented Oct. 6, 1964

3,151,988
METHOD OF PREPARING AN IMPROVED SKIN-
LESS TYPE MEAT PRODUCT
Charles B. Rasmussen, Danville, Calif., assignor to
Stange Co., a corporation of Illinois
No Drawing. Filed May 3, 1961, Ser. No. 107,339
3 Claims. (Cl. 99—109)

The present invention relates to a new spice product and to the method of preparing the same, and to meat products utilizing the spice product. More particularly it relates to a ground spice product containing as a principal ingredient ground whole unrehydrated mustard seed.

In this invention, ground whole mustard seed is added to meat products, and particularly to meat products, such as sausage meats, frankfurters, bologna, loaf products, etc., and especially to formulations for skinless type meat products. It also finds utility when incorporated in other types of meat products, such as processed meat products, for example, deviled ham. It is particularly significant that the ground mustard seed product of the invention is incorporated into sausage meat or other meat products without previous (or subsequent) rehydration of the mustard. The mustard may be added to the meat product alone or in combination with other spice materials, such as ground spices or prepared spice extractives, such as oleoresins and spice oils.

An important feature of the invention is that the taste contribution of the ground mustard seed is "flavor-controlled" by purposely avoiding the rehydration of the mustard. In the conventional use of mustard, this rehydration is ordinarily effected either before the mustard product is added to the meat, or during the subsequent preparation or processing of the meat product. By avoiding rehydration, and thus controlling the flavor contribution of the mustard, it has been found feasible to use a much higher concentration of the ground mustard than could normally be incorporated into a product without rendering the final finished product unsuitable for consumption. As a result, in accordance with the practice of this invention, it is possible to utilize and take advantage of other important beneficial properties which are inherent in the whole ground mustard seed, some of which properties have long been known, and others of which are newly discovered and which provide the basis of the present invention.

It is well known that in addition to their flavor, taste and odor-imparting activity, many spices possess other important and desirable properties. In many instances, these properties are inherent in the spice as normally used, and the benefits of the particular features of the spice are enjoyed without the necessity of special preliminary treatment or processing operations. Some spice materials have been shown to contain natural antioxidants, such as tocopherols. Other spices have been demonstrated to posses unique anti-bacterial active agents. Still others have been found to contain fungicides or anti-mycotic agents. Mustard flour, as ordinarily used, has been known to possess some of these properties to some degrees. It has been known that the incorporation of mustard flour in such food products as mayonnaise and salad dressings improves the emulsification of the final mixture.

At least two principal varieties of mustard suitable for practice of this invention are available on the market. These are white mustard and yellow seeded oriental mustard. They differ somewhat in their specific analyses but for the most part may be used interchangeably for many purposes. The mustard seed itself is composed of three principal fractions which may be described as the outer hull or husk or bran, and the inner portion which is composed of what is known as the mustard flour and the oils. The bran-free and oil-free mustard flour is the common mustard flavoring ingredient so widely used. In normal and conventional use, the mustard seeds, which have been air dried with or without auxiliary heat, are processed and the bran-free, oil-free flour obtained. Ordinarily, this mustard flour is then "rehydrated" by water treatment and it is during this rehydration step that enzymatic reactions occur and the typical mustard flavor and taste are developed.

An important discovery related to the instant invention is that particularly unique properties and unusual features are possessed by a mustard product which comprises the ground whole mustard, containing substantially all of the constituents of the original whole spice or mustard seed, rather than merely the mustard flour. It has been found that the inclusion of the ground whole mustard of the invention in sausage products, such as wieners, bologna, Vienna sausage, and others has the desirable effects not only of deterring oxidative rancidity, improving mold and fungi resistance, and imparting improved bacterial resistance, but has also the desirable effect of producing other surprising and unexpected results which give rise to a highly improved meat product.

A very important consideration in the manufacture of skinless frankfurters is the problem of peelability. By this is meant the ease with which the casing is removed from the frankfurter subsequent to stuffing and processing or smoking. To the degree that the casing cannot be easily and readily removed, there is considerable breakage of the sausage product causing extensive reworking of portions of the product with associated expense and loss of time and effort. Another problem which arises in connection with the manufacture of sausage products and related products is excessive weight loss during smoking. This excessive weight loss or shrinkage is to be avoided not only because of the increased production cost associated therewith, but also because of the impaired physical properties of the final product and the difficulty of producing uniform products from batch to batch. Still another problem in the manufacture of sausage products is the development of fat pockets or fat caps (especially in the case of skinless sausages) in the final sausage product. These fat pockets or fat caps affect adversely the appearance and the general attractiveness of the product and also suggest nonhomogeneity. It has been found, in accordance with the practice of this invention, that the incorporation of unrehydrated ground whole mustard seed in the sausage product produces a final meat product of improved physical and chemical characteristics and provides a solution to all of the problems described above. In addition to solving the above problems, the incorporation of the ground mustard of the invention also imparts other beneficial properties and desirable qualities to the final meat product.

It is a principal object of this invention to enable one to produce sausage, wieners, and related products of improved taste, quality, texture, appearance, and keeping properties.

It is also an object of this invention to provide a spice product which, when used in sausage products such as frankfurters of the skinless variety, will improve the ease with which the casing is removed subsequent to stuffing and processing or smoking.

Among the other objects of the invention are: to avoid the formation of fat caps or fat pockets in sausage meat products; to improve the emulsification of the aqueous and nonaqueous phases of sausage products; to control the weight loss of sausage products during processing and during smoking; to improve the resistance of meat products to oxidative rancidity; to improve the retention of the desirable color characteristics of freshly prepared sausage products; to decrease the percent of breakage in the deskinning of skinless frankfurters, and to reduce the amount of reworking necessary; to improve the stuffing characteristics of sausage meat products; and to increase the overall homogeneity of sausage meat products, and to prevent phase separation.

Still further objects and advantages will appear in the description set forth below, it being understood, however, that this description is given by way of illustration and explanation only, and not by way of limitation, since various changes may be made by those skilled in the art without departing from the scope and spirit of the present invention.

It has been found that the above objects may be accomplished simply by adding to the sausage product or other food product a quantity of ground unrehydrated whole mustard seed. While the exact particle size to which the mustard seed should be reduced for the purposes of the invention is not critical, it has been found that superior results are obtained when the mustard is ground to a relatively small particle dimension, for example, preferably in the range of 25 to 100 or 200 microns. Even finer grinds may be used. Moreover, for many purposes and for particular products, satisfactory results are obtained where the mustard seed has been ground to particles of a size considerably larger than the preferred particle size. The optimum concentration of ground unrehydrated mustard to be incorporated in any particular meat product or sausage product will depend upon many factors and may vary considerably from product to product. However, it has been found that when the ground mustard of the invention is used in combination with other spices and is incorporated into a product, such as pork sausage, that a concentration of about 1 to about 3 pounds of ground mustard to about 100 pounds of pork sausage meat gives a highly satisfactory product. If desired, the ground mustard may be added directly to the chopper without having been previously combined with the other spice materials to be used in the sausage product. However, a preferred method of adding the ground mustard to a sausage product is to mix the other spice products, in the form of spice oils or oleoresins, with a soluble carrier, such as sugar or salt. The sugar or salt, together with the oleoresins or spice oils, is mixed with the ground mustard and the entire composite spice preparation added directly to the chopper. A typical formulation of spice materials, together with a preferred amount of the ground whole mustard of the invention, is shown in Table 1.

*Table 1*

| | Parts |
|---|---|
| Oleoresin of capsicum | 0.47 |
| Oil of cardamon | 0.06 |
| Oil of sage | 0.25 |
| Oleoresin of celery | 0.22 |
| Sugar (e.g. dextrose or sucrose) or salt | 33 |
| Ground whole mustard (unrehydrated) | 66 |

About 1 to 3 pounds of the above composition is added to about 100 pounds of pork sausage.

As an alternative to using the oleoresins or spice oils, it may be preferred to use the ground spices themselves and combine these spices with the ground whole mustard.

A typical procedure for preparing a sausage product, for example, frankfurters, is described below. A prepared mixture of meat, spices, etc., is stuffed into casings. In the practice of the present invention, unrehydrated ground whole mustard is included in the prepared mix. The frankfurters are then placed on racks in a smoking room where they are brought to an internal temperature of about 140°–150° F. During this treatment, the meat swells to fill the casing and some rigidity is obtained. After a smoking treatment of about 30 to 40 minutes or more, the frankfurters are removed to a chamber in which hot water at a temperature of about 175° F. is sprayed over them for 7 or 8 minutes. They may be immersed in water at this temperature. The cooking reduces somewhat the intensity of the red color developed in the smoking room and imparts additional rigidity to the product. Finally, the material is removed from the cooking room, cooled, and, in the case of skinless frankfurters, the casings are stripped off and the product is packed for storage and sale.

It must be kept in mind that particular attention should be directed to avoiding excessive rehydration of the mustard in the final product. Only by carefully controlling the degree of rehydration is it possible to avoid the development of excessive mustard taste and flavor in the final sausage product.

Although no conclusive experimental evidence has yet been obtained, and the mechanism of the phenomenon is as yet unknown, it is believed that the marked improvement in the peelability of sausage products, prepared in accordance with the practice of the present invention, may be due to one or more factors, or to a combination of factors. One possible factor is the marked improvement in the state of emulsification of the sausage products which contain the unrehydrated ground whole spice of the invention. The improved emulsion provides a final meat product which is much more homogeneous than the usual products, and in which local concentrations or islands or pockets of fat-insoluble or of water-insoluble substances are absent. It is also possible that the fixed oil or some other chemical constituent present in the whole ground mustard may be responsible, at least in part, for the improved results realized.

The ground unrehydrated mustard of the invention, when added to sausage meat such as pork sausage, has a surprising beneficial effect upon the color of the final product. Whereas the red color of the lean meat portions of the pork sausage ordinarily fades rapidly to a grayish hue, it has been found that, even after the passage of a considerable time, the lean meat portions of pork sausage containing the mustard product of the invention retain their desirable original reddish appearance. Investigation of this important phenomenon has established that in all cases the persistence and retention of the normal red color is correlated with palatability, low bacteria count, and general suitability of the meat product for human consumption. In this respect, the effect of the ground mustard may be contrasted with the misleading effect of chemical additives which are sometimes used to preserve the color of meat products. These chemical color preservatives may cause the meat product to retain a desirable appearance while at the same time the meat product may long since have deteriorated to a condition such that the product itself is no longer suitable for consumption.

While this invention has been described in conjunction with the present preferred embodiments and procedures, it is evident that the invention is not limited thereto. Further modifications of the method and products disclosed herein which fall within the scope of the following claims will be immediately evident to those skilled in this art. To the extent that these changes and modifications are within the scope of the appended claims, they are to be considered a part of this invention.

I claim:

1. A method of improving the homogeneity, color, fat and water emulsification, appearance, texture, stability, resistance to oxidative rancidity, moisture absorption and retention, bacterial and mold resistance, weight retention, and peelability of skinless type meat products and other comminuted meat products having fat and lean meat portions, which method comprises combining and comminuting said fat and lean meat portions to provide an intimate and homogeneous mixture thereof; adding spice principles to said mixture, said spice principles being selected from the group consisting of spice extractives and ground spices; incorporating into said spice and meat mixture ground, whole, unrehydrated mustard; stuffing said mixture including said ground, unrehydrated mustard into casings; and processing said combined spices and meat to provide a final product of improved appearance, stability, and storage life, and which has superior peelability whereby, subsequent to processing, the casings can be removed quickly and easily with a minimum of breakage of the final meat product.

2. The method of claim 1 wherein said ground mustard is incorporated into said spice and meat mixture in an amount of about 1–3% by weight of said spice and meat mixture.

3. The method of claim 1 wherein said ground mustard is in the form of particles in the size range of 25–200 microns.

References Cited in the file of this patent
UNITED STATES PATENTS

| | | |
|---|---|---|
| 2,355,548 | Musher | Aug. 8, 1944 |
| 2,874,054 | Kircher et al. | Feb. 17, 1959 |
| 3,008,832 | Gorsica | Nov. 14, 1961 |

OTHER REFERENCES

"The Encyclopedia of Food," 1923, by A. Ward, published by A. Ward, 51 Union Square, New York, page 339, article entitled Mustard.